3,050,475
Patented Aug. 21, 1962

3,050,475
PRODUCTION OF POLYURETHANE PLASTICS USING SCHIFF'S BASE CATALYSTS
Erwin Müller, Leverkusen, Christian Wiegand, Wuppertal-Elberfeld, and Günther Braun, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Original application Oct. 18, 1956, Ser. No. 616,606, now Patent No. 3,004,933, dated Oct. 17, 1961. Divided and this application May 18, 1961, Ser. No. 110,881
Claims priority, application Germany Oct. 22, 1955
5 Claims. (Cl. 260—2.5)

This invention relates to a new process for the production of polyurethane plastics. More particularly, the invention is concerned with the use of new catalysts in the production of polyurethane plastics from polyhydroxy compounds and polyisocyanates. This application is a divisional of our co-pending application Serial No. 616,606, filed October 18, 1956, now U.S. Patent 3,004,933, granted October 17, 1961.

It is well known to produce polyurethane plastics from polyhydroxy compounds and polyisocyanates (see, for example, Otto Bayer, Angew. Chem. A 59, 257 (1947)). Depending upon the conditions of reaction and the specific reactants used, the process results in plastic foams, rubber-like materials or sheet-like structures, such as films, foils, coatings, adhesives and impregnations. It is also known to use tertiary amines and/or soluble metal compounds as catalysts in the polyaddition reaction between polyisocyanates and polyhydroxy compounds. Furthermore, it has already been proposed to accelerate the polyurethane formation from polyhydroxy compounds and polyisocyanates by the addition of small amounts of Schiff's bases, that is, compounds containing the grouping —CH=N. However, in the production of certain high molecular cross-linked polyurethanes, in particular in the production of plastic foams and rubber-like materials, Schiff's bases did not prove to be satisfactory catalysts. Thus, in the production of polyurethane foam, the use of Schiff's bases leads to a strong shrinkage and consequently to the formation of foams of undesirably high density. In the production of rubber-like polyurethanes from slow reacting polyisocyanates, the Schiff's bases do not accelerate the reaction to the desired degree.

It is an object of the present invention to provide new catalysts for the production of polyurethane plastics. Another object is to provide catalysts which accelerate the reaction between polyisocyanates and polyhydroxy compounds without having undesirable side effects. A further object is to provide catalysts which due to their high activity permit the use of slow reacting polyisocyanates in the production of polyurethane plastics. A still further object is to provide a process for the production of polyurethane plastics from polyhydroxy compounds and polyisocyanates, using these new catalysts. Still further objects will appear hereinafter.

In accordance with the present invention, it has now been found that Schiff's bases containing a tertiary nitrogen atom and/or a reactive hydrogen atom capable of reacting with isocyanato groups constitute most valuable catalysts for the production of polyurethane plastics. Accordingly, the present invention provides a process for the production of polyurethane plastics which comprises reacting a polyisocyanate with a polyhydroxy compound in the presence of a small amount of a Schiff's base containing a tertiary nitrogen atom and/or a reactive hydrogen atom capable of reacting with isocyanato groups. The new catalysts are preferably used in amounts of 1 to 10% by weight, based on the weight of the polyhydroxy compound, but it is also possible to employ smaller or larger quantities of catalyst if desired.

Representative examples of Schiff's bases containing a tertiary nitrogen atom and/or a reactive hydrogen atom capable of reacting with isocyanato groups which may be used as catalysts in accordance with the invention include inter alia the following compounds:

(1)

![structure 1] B.P. 124°/0.3 mm.

(2)

![structure 2] B.P. 113°/0.8 mm.

(3)

$CH_3$-$CH_2$-$CH_2$-CH=C-CH=N-$(CH_2)_3$-N(CH_3)(CH_3)  B.P. 86°/0.5 mm
          |
          $C_2H_5$ (4)

![structure 4] B.P. 140-144°/0.4 mm.

(5)

HO-$CH_2$-$CH_2$-O-⟨⟩-CH=N-N=CH-⟨⟩-O$CH_2$$CH_2$-OH   M.P. 186°

(6)

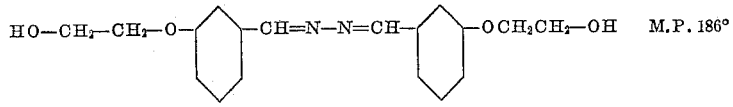
HO-$CH_2$-$CH_2$-N=CH-⟨⟩-CH=N-$CH_2$-$CH_2$-OH   M.P. 136°

If desired, the Schiff's bases containing a tertiary nitrogen atom may be used in the form of salts with inorganic or organic acids rather than as free bases. The Schiff's bases are obtainable in known manner from the corresponding aldehydes and amines.

Among the polyhydroxy compounds which may be used in the practice of the invention are hydroxyl polyesters, hydroxyl polyester amides, hydroxyl polyethers, hydroxyl polythioethers and hydrogenation products of ethylene carbon monoxide copolymers. These compounds may be employed as such or upon reaction with such an amount of a polyisocyanate as to form a polyaddition product containing free hydroxyl groups. The polyhydroxyl compounds are obtainable by known methods. Thus, suitable hydroxyl polyesters are prepared by thermal esterification of polybasic acids with polyhydric alcohols, using an excess of the alcoholic component in order to form an end product containing free hydroxyl groups. Suitable hydroxyl polyethers may be produced by etherification of polyhydric alcohols or polymerization of tetrahydrofuran while useful hydroxyl polythioethers may be made by etherification of mixtures containing glycols and thioether glycols.

As examples of polyisocyanates which may be reacted with polyhydroxyl compounds in accordance with this invention, there may be mentioned hexamethylene diisocyanate, 2,4-toluylene diisocyanate, 2,6-toluylene diisocyanate and technical mixtures thereof, naphthylene-1,5-diisocyanate, p-phenylene diisocyanate, 4,4''-diphenylmethane diisocyanate, 4,4',4''-triphenylmethane triisocyanate and isocyanate modified polyhydroxy compounds containing free NCO groups.

In carrying out the process of the invention, there are used the conventional conditions of reaction. Thus, high-grade materials of rubber-like characteristics are obtained by reacting at elevated temperature a substantially linear polyhydroxy compound and a small amount of a Schiff's base of the type hereinabove described with an amount of diisocyanate in excess of that for a mere lengthening of the chain and heating the product thus formed with a cross-linking agent, such as an alkylene glycol, a diamine or water to form a cross-linked polyurethane rubber. Alternatively, a substantially linear polyhydroxy compound may be reacted in the presence of a Schiff's base of the above-described type with excess diisocyanate to obtain a polyaddition product containing free isocyanato groups whereupon this product is reacted with a diamine and/or a glycol in such an amount as to produce a storage stable intermediate containing free amino and/or hydroxyl groups. The storage stable intermediate is then cured in a second process step by reaction with a further amount of diisocyanate to thereby form a rubber-like material. The material can be shaped during its formation or at a later stage.

To produce a polyurethane foam, a polyhydroxy compound and a small amount of a Schiff's base of the above-defined type are reacted with excess polyisocyanate and a minor amount of water, preferably in the presence of a surface active agent. In the foaming process, there are ordinarily used 0.5 to 1.5 mols of diisocyanate per 1 mol of OH contained in the polyhydroxy compound. The water is generally employed in an amount of 0.5 to 5% by weight, based on the weight of the polyhydroxy compound. Whereas substantially linear polyhydroxy compounds having an hydroxyl number below 150 will react with polyisocyanates to form elastic foams, rigid foams are obtained if a polyisocyanate is reacted with a branched polyhydroxy compound having an hydroxyl number above 150.

Schiff's bases containing a tertiary nitrogen atom and/or a reactive hydrogen atom capable of reacting with isocyanato groups, which are used as catalysts in the process of the invention, not only accelerate the reaction between polyhydroxy compounds and polyisocyanates but also impart desirable properties to the polyurethane plastics produced. Thus, rigid polyurethane foam prepared in accordance with the invention has an increased resistance to deterioration by heat.

The invention is further illustrated by the following examples without being restricted thereto. Parts indicated are parts by weight.

*Example 1*

A mixture consisting of 80 parts of a polyester prepared from 4 mols of trimethylolpropane, 2.5 mols of adipic acid and 0.5 mol of phthalic acid, having the hydroxyl number 250 and 20 parts of a polyester prepared from 2 mols of trimethylolpropane, 2 mols of butylene glycol and 3 mols of adipic acid, having the hydroxyl number 250, is mixed with 1 part of the Schiff's base No. 1( see column 2), 1.5 parts of water and 5 parts of sulfonated castor oil. Then foaming is carried out by adding while stirring 78 parts of toluylene diisocyanate-1,2,4 and -1,2,6 (isomer ratio 70:30). There is obtained a rigid polyurethane foam having the following properties:

| Density, kg./cm.$^3$ | Compressive Strength, kg./cm.$^3$ | Impact Strength, kg./cm.$^2$ | Water Absorption, Vol. percent | Heat Distortion Temperature, ° C. |
|---|---|---|---|---|
| 35 | 1.36 | 0.11 | 1 | 129 |

If the above polyester mixture is mixed with 1 part of the Schiff's base No. 2 (see column 2), 1.5 part of water and 5 parts of sulfonated castor oil, there is obtained upon foaming with 77 parts of toluylene diisocyanate-1,2,4 and -1,2,6 (isomer ratio 70:30) a rigid polyurethane foam having the following mechanical properties:

| Density, kg./cm.$^3$ | Compressive Strength, kg./cm.$^3$ | Impact Strength, kg./cm.$^2$ | Water Absorption, Vol. percent | Heat Distortion Temperature, ° C. |
|---|---|---|---|---|
| 38 | 1.75 | 0.07 | 0.8 | 114 |

If in the preceding recipe 2 parts of the Schiff's base No. 3 (see column 2) is substituted for the Schiff's base No. 2 (see column 2), the foam obtained has the following properties:

| Density, kg./cm.$^3$ | Compressive Strength, kg./cm.$^3$ | Impact Strength, kg./cm.$^2$ | Water Absorption, Vol. percent | Heat Distortion Temperature, ° C. |
|---|---|---|---|---|
| 34 | 1.39 | 0.22 | 1.7 | 126 |

*Example 2*

100 parts of a polyester having the hydroxyl number 52 and prepared from 15 mol of adipic acid, 16 mol of diethylene glycol and 1 mol of trimethylolpropane are mixed with 1.5 parts of diethylammonium oleate, 0.75 part of sulfonated castor oil, 0.75 part of sulfonated ricinoleic acid, 1.5 parts Schiff's base No. 3 and 1.5 parts of water.

Foaming is carried out by injecting 37 parts of toluylene diisocyanate-1,2,4 and -1,2,6 (isomer ratio 70:30) into the polyester-activator-water mixture as described in U.S. Patent 2,764,565. The foam obtained has the following properties:

| Density, kg./cm.$^3$ | Elasticity, percent | Tear resistance, kg./cm. | Tensile strength, kg./cm.$^2$ | Ultimate elongation, percent |
|---|---|---|---|---|
| 36 | 27 | 0.37 | 0.85 | 111 |

*Example 3*

200 parts of a polyester of the hydroxyl number 56, prepared from 1,460 parts of adipic acid and 680 parts of ethylene glycol, are mixed with 14.6 parts of the Schiff's base No. 5 (see column 2). The mixture is dehydrated by heating at 130° C./12 mm. Eventually, the temperature is raised to about 135°–140° C. and the clear melt thus obtained is mixed with 40 parts of 4,4''-diphenylmethane diisocyanate. The homogeneous mixture is poured into molds and heated therein at 100° C. for 15 to 20 hours. Thus, there is obtained a rubber-like material having the following mechanical properties:

| Tensile Strength, kg./cm.² | Elongation, percent | Permanent Elongation, percent | Structural Strength, kg./cm. | Load at 55 kg./cm.² | Shore Hardness | Elasticity, percent |
|---|---|---|---|---|---|---|
| 225 | 685 | 22 | 32 | up to 300% elongation. | 71 | 41 |

While certain representative embodiments and details have been shown for the purpose of illustrating this invention, it will be apparent to those skilled in the art that various changes and modifications may be made therein without departing from the spirit and scope of the invention.

What is claimed is:

1. In the manufacture of a polyurethane plastic by a process which comprises reacting an organic polyisocyanate with an organic compound having a plurality of hydroxyl groups reactive with an —NCO group, said organic compound being capable of forming a polyurethane by reaction with an organic polyisocyanate, the improved method of making a polyurethane plastic which comprises bringing about the reaction in the presence of from about 1 percent to about 10 percent by weight of a Schiff's base having a tertiary nitrogen atom.

2. In the manufacture of a cellular polyurethane plastic by a process which comprises reacting an organic polyisocyanate with water and an organic compound having a plurality of hydroxyl groups reactive with an —NCO group, said organic compound being capable of forming a polyurethane by reaction with an organic polyisocyanate, the method of making an elastic cellular polyurethane plastic which comprises reacting the organic polyisocyanate with water and an organic compound having hydroxyl groups reactive with an —NCO group and having an hydroxyl number below 150 in the presence of a Schiff's base having a tertiary nitrogen atom.

3. In the manufacture of a cellular polyurethane plastic by a process which comprises reacting an organic polyisocyanate with water and an organic compound having a plurality of hydroxyl groups reactive with an —NCO group, said organic compound being capable of forming a polyurethane by reaction with an organic polyisocyanate, the method of making a rigid cellular polyurethane plastic foam which comprises reacting the organic polyisocyanate with water and an organic compound having hydroxyl groups reactive with an —NCO group and having an hydroxyl number above 150 in the presence of a Schiff's base having a tertiary nitrogen atom.

4. In the manufacture of a polyurethane plastic by a process which comprises reacting an organic polyisocyanate with a compound selected from the group consisting of an hydroxyl terminated polyester and a polyalkylene ether glycol, the improved method for making a polyurethane plastic which comprises bringing about the said reaction in the presence of from about 1 percent to about 10 percent by weight of a Schiff's base having a tertiary nitrogen atom.

5. In the manufacture of a polyurethane plastic by a process which comprises reacting an organic polyisocyanate with an hydroxyl terminated polyester, the improved method for making a polyurethane plastic which comprises bringing about the said reaction in the presence of from about 1 percent to about 10 percent by weight of a Schiff's base having a tertiary nitrogen atom.

References Cited in the file of this patent

UNITED STATES PATENTS

| 2,650,212 | Windemuth | Aug. 25, 1953 |
| 2,764,565 | Hoppe et al. | Sept. 25, 1956 |

FOREIGN PATENTS

| 712,053 | Great Britain | July 14, 1954 |
| 152,153 | Australia | July 2, 1953 |

OTHER REFERENCES

Dombrow: "Polyurethanes," copyright 1957, pages 18, 25 and 26.

Sanders et al.: "Chemical Reviews," 1948, volume 48, pages 203–218, pages 210 and 211 relied upon.